(12) United States Patent
Kuo et al.

(10) Patent No.: US 10,819,514 B2
(45) Date of Patent: Oct. 27, 2020

(54) ELECTRONIC COMPONENT OF ELECTRONIC DEVICE, METHOD OF STARTING ELECTRONIC DEVICE AND ENCRYPTION METHOD

(71) Applicant: REALTEK SEMICONDUCTOR CORPORATION, Hsinchu (TW)

(72) Inventors: Chen-Feng Kuo, Hsinchu (TW); Ji-Pin Jou, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 174 days.

(21) Appl. No.: 15/711,501

(22) Filed: Sep. 21, 2017

(65) Prior Publication Data

US 2018/0183590 A1    Jun. 28, 2018

(30) Foreign Application Priority Data

Dec. 27, 2016   (TW) .............................. 105143273 A

(51) Int. Cl.
| | | |
|---|---|---|
| *H04L 9/08* | (2006.01) | |
| *H04L 9/30* | (2006.01) | |
| *H04L 9/14* | (2006.01) | |
| *G06F 21/57* | (2013.01) | |
| *G06F 9/4401* | (2018.01) | |

(52) U.S. Cl.
CPC .......... *H04L 9/0894* (2013.01); *G06F 9/4401* (2013.01); *G06F 21/572* (2013.01); *H04L 9/0838* (2013.01); *H04L 9/0861* (2013.01); *H04L 9/14* (2013.01); *H04L 9/30* (2013.01); *G06F 9/4406* (2013.01)

(58) Field of Classification Search
CPC ....... H04L 9/08; H04L 9/0894; H04L 9/0838; H04L 9/14; H04L 9/30; H04L 9/0861; G06F 9/4406; G06F 9/4401; G06F 21/572

USPC ................ 713/1, 2, 171; 380/255, 259, 286, 380/277–279
See application file for complete search history.

(56) References Cited

U.S. PATENT DOCUMENTS

| | | | |
|---|---|---|---|
| 8,856,941 B2 * | 10/2014 | Cha ........................ | G06F 21/57 726/26 |
| 9,436,846 B2 * | 9/2016 | Hartley ............ | H04N 21/42646 |

(Continued)

FOREIGN PATENT DOCUMENTS

| | | | | |
|---|---|---|---|---|
| KR | 20180060300 A | * | 6/2018 | ........... H04L 9/0825 |
| TW | 201628368 | | 8/2016 | |

OTHER PUBLICATIONS

U.S. Pat. No. 8,856,941 is the counterpart application for Taiwan Publication TW 201628368.

*Primary Examiner* — Saleh Najjar
*Assistant Examiner* — Khalid M Almaghayreh
(74) *Attorney, Agent, or Firm* — WPAT, PC

(57) ABSTRACT

An electronic component of an electronic device, a method of starting an electronic device, and an encryption method. The electronic device includes a key storage unit that stores a first key, a key protection circuit that controls access of the key storage unit, and a storage unit that stores a second key and encrypted booting instructions. The method of starting an electronic device includes steps of: reading the first key from the key storage unit; reading the second key from the storage unit; generating a third key according to the first key and the second key; using the third key to decrypt the encrypted booting instructions; and executing the booting instructions.

16 Claims, 4 Drawing Sheets

(56) References Cited

U.S. PATENT DOCUMENTS

| | | | | |
|---|---|---|---|---|
| 9,674,162 B1* | 6/2017 | Miller | .................. | G06F 12/1408 |
| 2002/0152392 A1* | 10/2002 | Hardy | .................. | H04L 9/0877 |
| | | | | 713/189 |
| 2005/0018854 A1* | 1/2005 | Yamamoto | ......... | G11B 20/0021 |
| | | | | 380/277 |
| 2006/0155988 A1* | 7/2006 | Hunter | .................. | G06F 21/575 |
| | | | | 713/164 |
| 2008/0107275 A1* | 5/2008 | Asnaashari | ............. | G06F 21/80 |
| | | | | 380/281 |
| 2009/0202069 A1* | 8/2009 | Cox | ...................... | H04L 9/0822 |
| | | | | 380/44 |
| 2009/0276617 A1* | 11/2009 | Grell | ..................... | G06F 21/575 |
| | | | | 713/2 |
| 2011/0022850 A1* | 1/2011 | Lee | ........................ | G06F 21/79 |
| | | | | 713/189 |
| 2011/0302638 A1* | 12/2011 | Cha | ........................ | H04L 63/08 |
| | | | | 726/6 |
| 2012/0079279 A1* | 3/2012 | Leclercq | ............... | H04L 9/0869 |
| | | | | 713/187 |
| 2012/0087494 A1* | 4/2012 | Spalka | ................. | H04L 9/0825 |
| | | | | 380/46 |
| 2012/0170743 A1* | 7/2012 | Senese | ................ | H04W 12/001 |
| | | | | 380/259 |
| 2017/0124329 A1* | 5/2017 | Ghafoor | ................ | H04L 9/0861 |
| 2018/0152454 A1* | 5/2018 | Kwon | ..................... | H04L 63/10 |

* cited by examiner

ELECTRONIC COMPONENT OF ELECTRONIC DEVICE, METHOD OF STARTING ELECTRONIC DEVICE AND ENCRYPTION METHOD

BACKGROUND

1. Field of the Disclosure

The present disclosure generally relates to an electronic device, and more particularly, to a starting method of the electronic device, an electronic component of the electronic device, and an encryption method for confidential data of the electronic device.

2. Description of Related Art

The program instructions in the electronic device are usually treated as trade secrets, so the manufacturer of the electronic device encrypts the program instructions to prevent theft. FIG. 1 shows a flow chart of key generation as well as encryption and decryption procedures in the prior art, for the purpose of protecting the program instructions in the electronic device. For example, a manufacturer A is an intermediate product manufacturer of an electronic device. The manufacturer A obtains electronic components (e.g., a control chip, an application-specific integrated circuit (ASIC), or the like) from an electronic component manufacturer, and uses the electronic components to produce the intermediate product of the electronic device. The manufacturer A generates a private key of an asymmetric key pair when manufacturing the product, generates a public key corresponding to the private key based on an algorithm (e.g., the Curve25519 algorithm, refer to en.wikipedia.org/wiki/Curve25519 for details), and then stores the private key in the intermediate product of the electronic device. More specifically, the private key is stored in a secure storage area in the electronic component, with the access permission to the secure storage area being strictly regulated. The intermediate product of the electronic device and the public key are then sent to a manufacturer B, who is the developer or provider of the program instructions. After the program instructions are completely developed, the manufacturer B generates a symmetric key, uses the symmetric key to encrypt the program instructions, uses the public key to encrypt the symmetric key, and then burns the encrypted symmetric key together with the encrypted program instructions into the device to complete the electronic device. When starting up at the user end, the electronic device reads the private key from the secure storage area of the electronic component, uses the private key to decrypt the encrypted symmetric key, and uses the symmetric key to decrypt the encrypted program instructions.

Since a large number of symmetric keys in the plaintext form are generated in the above-mentioned burning process, and the encrypted symmetric key can be directly accessed, the chance of the symmetric key being cracked is increased, which in turn raises the risk of the program instructions being stolen.

SUMMARY OF THE DISCLOSURE

In view of the issues of the prior art, an object of the present disclosure is to provide a method of starting an electronic device, an electronic component of the electronic device, and an encryption method of confidential data of the electronic device, so as to improve the safety of the electronic device.

An electronic component is provided. The electronic component includes a key storage unit, a key protection circuit, a storage unit, and a computing unit. The key storage unit stores a first key. The key protection circuit is coupled to the key storage unit and controls access of the key storage unit. The storage unit stores encrypted data and a second key. The computing unit performs the following steps: reading the first key from the key storage unit; reading the second key from the storage unit; generating a third key based on the first key and the second key; and using the third key to decrypt the encrypted data.

A method of starting an electronic device is also provided. The electronic device includes a key storage unit storing a first key, a key protection circuit controlling access of the key storage unit, and a storage unit storing a second key and encrypted booting instructions. The method includes steps of: reading the first key from the key storage unit; reading the second key from the storage unit; generating a third key based on the first key and the second key; using the third key to decrypt the encrypted booting instructions; and executing the booting instructions.

An encryption method is also disclosed. The encryption method is applied to an electronic device including a key storage unit and a storage unit. The encryption method includes steps of: generating a first asymmetric key pair including a first public key and a first private key; storing the first private key in the key storage unit; generating a second asymmetric key pair including a second public key and a second private key; using the first public key and the second private key to generate a symmetric key; encrypting data using the symmetric key to generate encrypted data; and storing the encrypted data and the second public key in the storage unit.

According to this disclosure, the method of starting an electronic device, an electronic component of the electronic device, and an encryption method of confidential data of the electronic device use two asymmetric key pairs to encrypt and decrypt confidential data. Therefore, this disclosure not only effectively prevents data theft, but also helps multiple manufacturers to cooperate in developing the electronic device while keeping their respective confidential data secured. Compared with the conventional technology, this disclosure is more flexible in implementation as this disclosure is not limited to using the same symmetric key to encrypt and decrypt the confidential data.

These and other objectives of the present disclosure no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a method of starting an electronic device, electronic components of the electronic device, and an encryption method for confidential data of the electronic device. On account of that some or all elements of said device could be known, the detail of such elements is omitted provided that this omission nowhere dissatisfies the specification and enablement requirements. Some or all of the processes of the method of starting an electronic device and the encryption method for confidential data of the electronic device may be implemented by software and/or firmware. In addition, on the condition that the specification and enablement requirements are satisfied, the description of these methods focuses on the steps rather than hardware.

Figure 1:
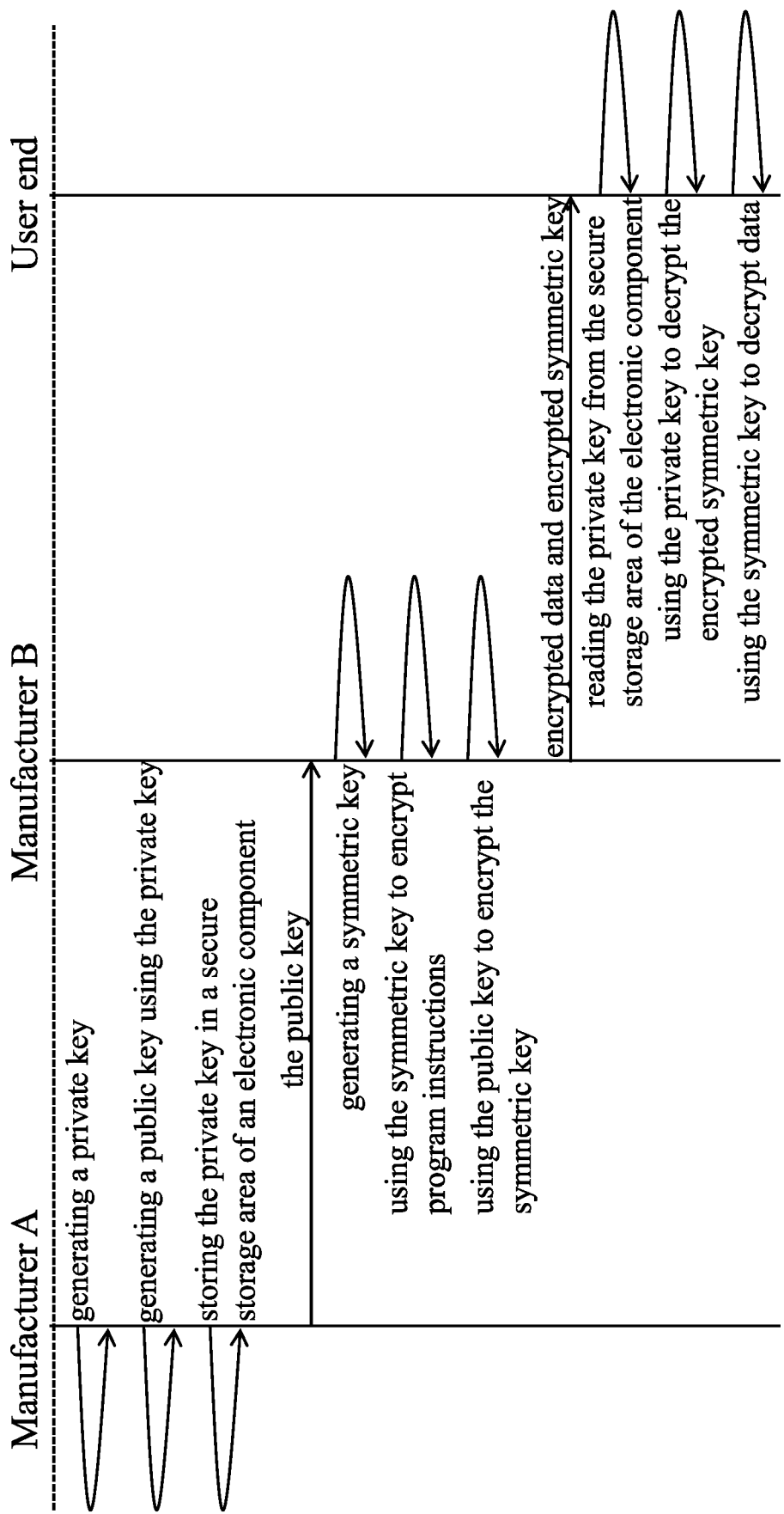
FIG. 1 illustrates a flow chart of key generation as well as encryption and decryption procedures.
Figure 2:
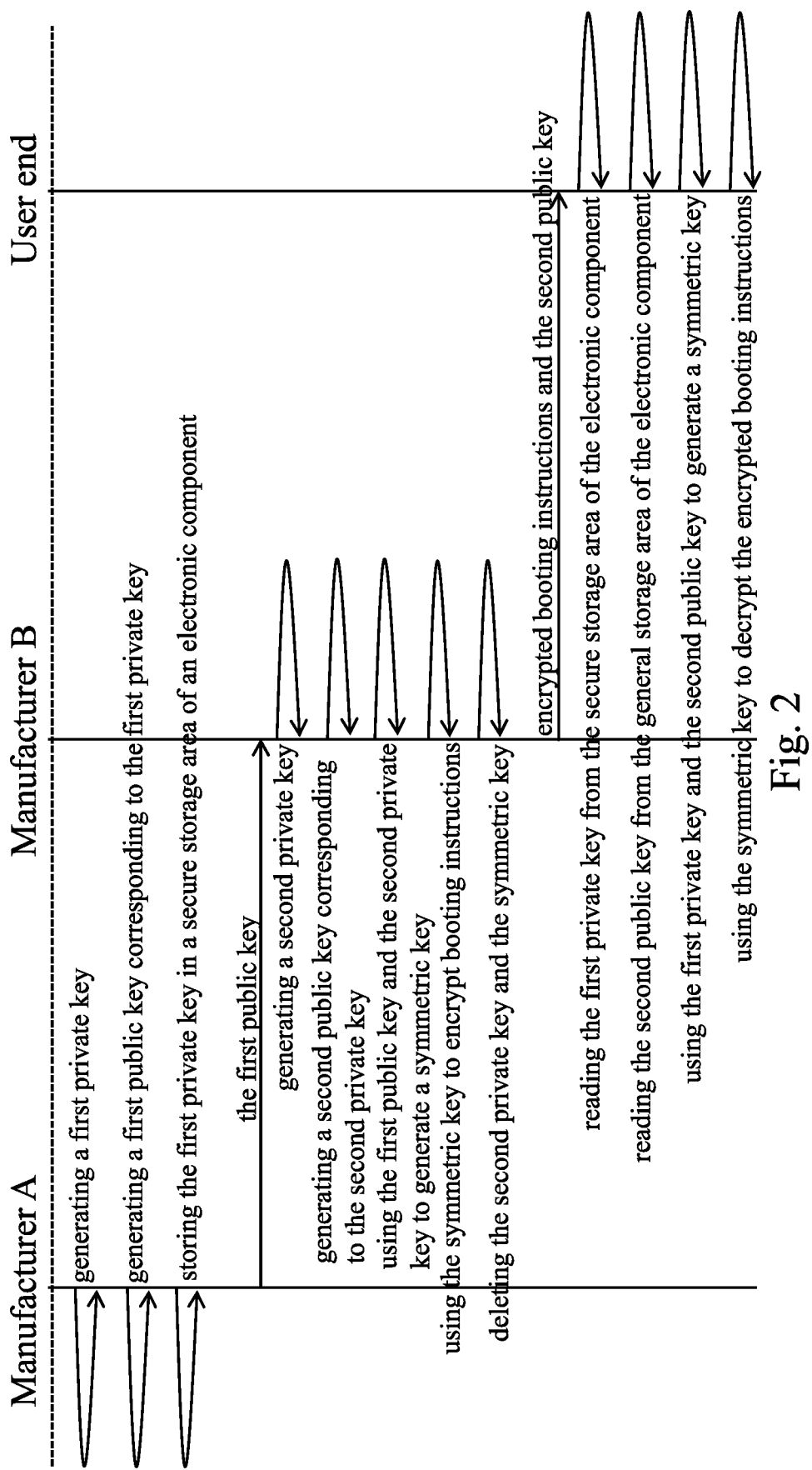
FIG. 2 illustrates a flowchart of encrypting and decrypting booting instructions of an electronic device according to an embodiment of this disclosure.

FIG. 2 shows a flowchart of encrypting and decrypting booting instructions of an electronic device according to an embodiment of this disclosure. A manufacturer A randomly generates a first asymmetric key pair (including a first public key and a first private key) and stores the first private key in a secure storage area of the electronic component (e.g., a one-time programmable (OTP) storage unit that employs a key scramble technology). A manufacturer B receives an intermediate product of the electronic device and the first public key from the manufacturer A. After completely developing the booting instructions (e.g., an image file being created), the manufacturer B randomly generates a second private key and generates a second public key corresponding to the second private key based on an algorithm (e.g., the Curve 25519 algorithm). The second public key and the second private key together make up a second asymmetric key pair. A symmetric key (e.g., a key complying with the Advanced Encryption Standard (AES)) is then generated using the first public key and the second private key according to an algorithm based on the Elliptic Curve Cryptography (ECC), such as the Curve25519 algorithm. Next, the booting instructions are encrypted using the symmetric key, and the second private key and the symmetric key are deleted after encryption. The second public key and the encrypted booting instructions are then stored in a general storage area of the electronic component to complete the electronic device.

On the user side, a starting procedure of the electronic device reads the first private key from the secure storage area of the electronic component and reads the second public key and the encrypted booting instructions from the general storage area of the electronic component. Next, a symmetric key is generated using the first private key and the second public key based on the same algorithm (e.g., the Curve25519 algorithm described above). The symmetric key generated in this way is inherently similar to the symmetric key used in the prior encryption process. Next, the symmetric key that has just been generated is employed to decrypt the encrypted booting instructions. The computing unit in the electronic component may then execute the booting instructions to cause the electronic device to start functioning.

Figure 3:
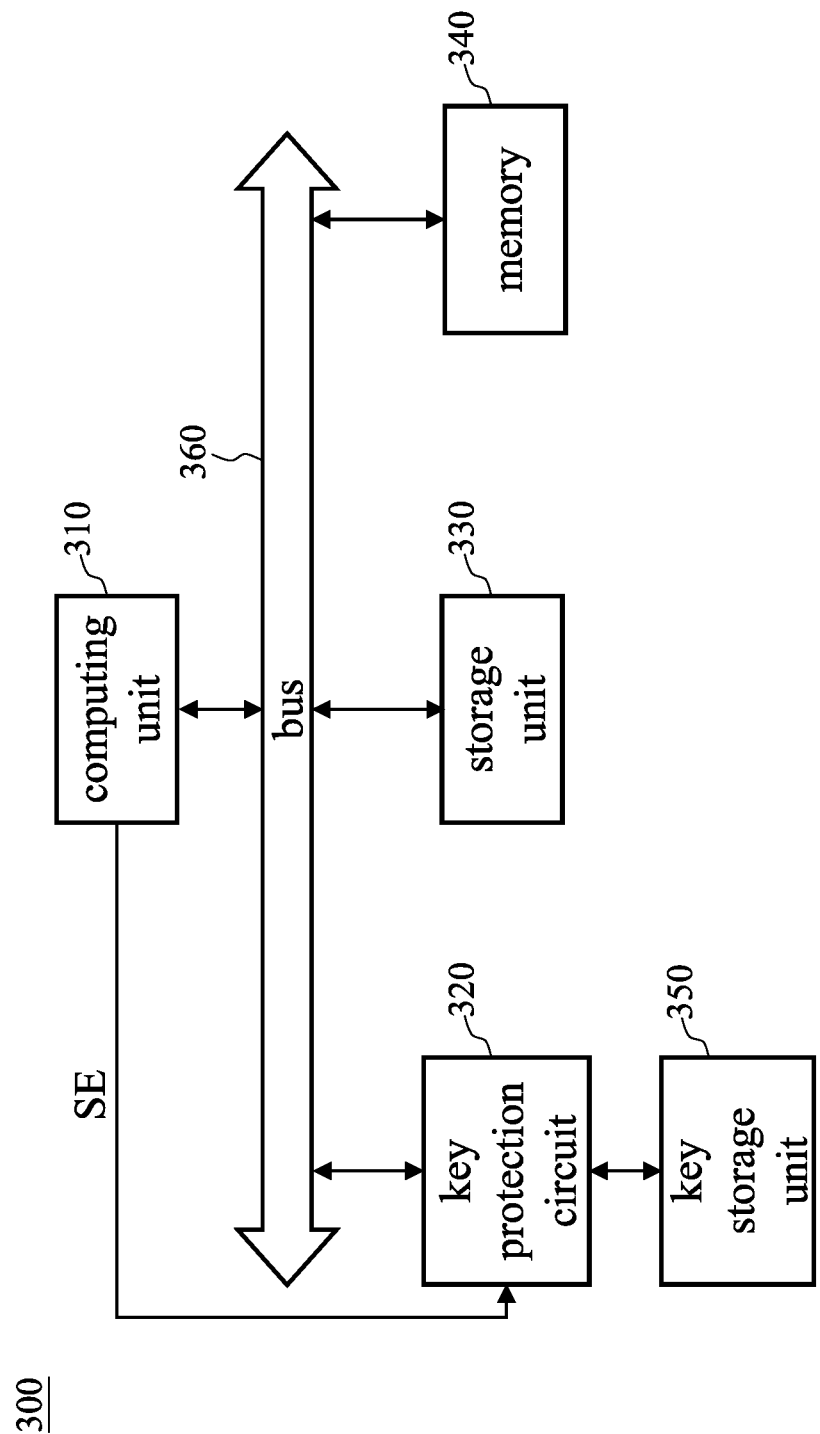
FIG. 3 illustrates a functional block diagram of the electronic component according to an embodiment of this disclosure.

FIG. 3 shows the functional block diagram of the electronic component according to an embodiment of this disclosure. The electronic component 300 is applied to the aforementioned electronic device and includes a computing unit 310, a key protection circuit 320, a storage unit 330, a memory 340, a key storage unit 350 and a bus 360. The computing unit 310 may be an element or circuit having computing and/or program instruction execution capabilities, such as a microprocessor, a microcontroller, a central processing unit, and the like. The computing unit 310 accesses the storage unit 330, the memory 340, and the key storage unit 350 through the bus 360. The key storage unit 350, protected by the key protection circuit 320, may be a nonvolatile memory (e.g., an electronic fuse (eFuse)) that stores the aforementioned first private key. More specifically, the computing unit 310 controls the key protection circuit 320 by a control signal SE to operate in a secure mode or a normal mode. In the secure mode, the key storage unit 350 cannot be accessed under the control of the key protection circuit 320. In the normal mode, the key storage unit 350 can be accessed under the control of the key protection circuit 320. The storage unit 330 may be a nonvolatile memory (e.g., a flash memory) that stores the encrypted booting instructions and the second public key. The memory 340 may be a volatile memory, such as a dynamic random access memory (DRAM). The memory 340 is a memory inside the electronic component 300 and cannot be accessed by an element or device external to the electronic component 300.

Figure 4:
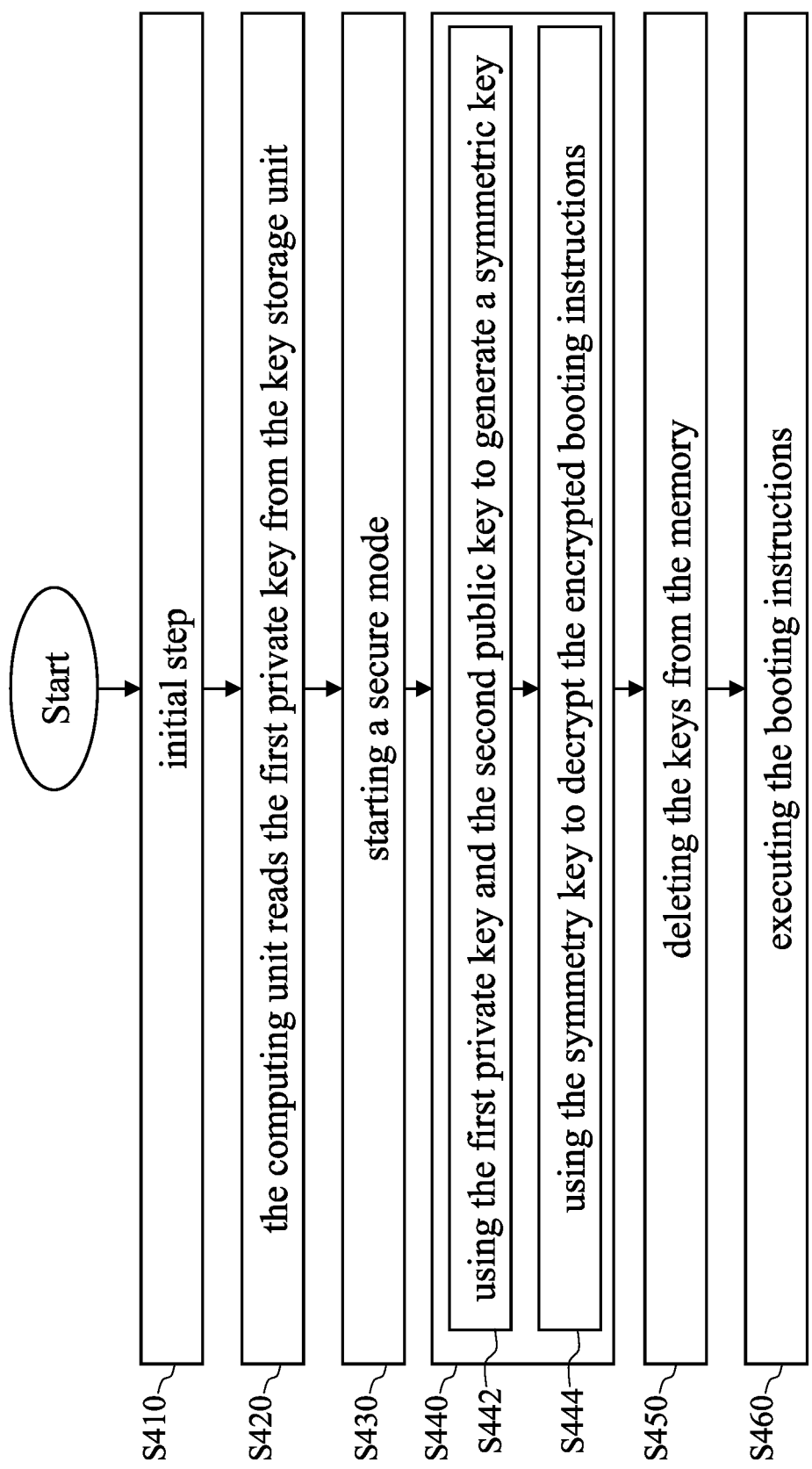
FIG. 4 illustrates a flow chart of one of the embodiments of the starting procedure of the electronic device.

FIG. 4 is a flow chart of one of the embodiments of the starting procedure of the aforementioned electronic device. Reference is made to both FIG. 3 and FIG. 4 for a better understanding of this disclosure. The computing unit 310 executes a system program (e.g., instructions for starting the electronic device) to perform the starting procedure shown in FIG. 4. The system program may be stored in a read-only memory (not shown) of the electronic component 300. In the initial step (S410), the computing unit 310 causes the electronic component 300 to exit the reset state and closes the debug port of the electronic component 300. The purpose of closing the debug port is to prevent confidential data (such as keys) from being maliciously recorded in the starting procedure. After step S410 is complete, the key protection circuit 320 is in the normal mode in which the key storage unit 350 can be accessed. Next, the computing unit 310 reads the first private key from the key storage unit 350 (step S420), and controls the key protection circuit 320 to change to the secure mode (step S430). In detail, preferably, the key storage unit 350 can be read by the computing unit 310 only when the computing unit 310 is executing the system program. After being read from the key storage unit 350, the first private key is temporarily stored in the memory 340. In step S430, the computing unit 310 issues the control signal SE to control the key protection circuit 320 to switch from the normal mode to the secure mode so that the key storage unit 350 cannot be accessed. Next, the computing unit 310 decrypts the encrypted booting instructions stored in the storage unit 330 (step S440). More specifically, the computing unit 310 first uses the first private key and the second public key to generate a symmetric key (step S442, the symmetric key generated is stored in the memory 340), and then the computing unit 310 uses the symmetry key to decrypt the encrypted booting instructions (step S444). The decrypted booting instructions are temporarily stored in the memory 340. The computing unit 310 then deletes the first private key and the symmetric key from the memory 340 (step S450) and executes the booting instructions to cause the electronic component 300 to start functioning (step S460). Note that the aforementioned first private key and second public key are not encrypted.

The process of FIG. 2 may have the following variants: (1) The manufacturer A hides the first private key in the burning program sent to the manufacturer B, and the burning program automatically generates the first public key when the manufacturer B conducts the burning process. The manufacturer B then uses the second public key and a second asymmetric key pair that is generated by the manufacturer B to perform the subsequent procedures. This method prevents the manufacturer A from directly passing the first public key to the manufacturer B. (2) The procedures originally performed by the manufacturer A can be performed by the manufacturer B instead. That is, the generation of the first asymmetric key pair and the step of storing the first private key in the secure storage area of the electronic component are performed by the manufacturer B. In this way, the manufacturer B can have initiative control of all the keys.

When the booting instructions of the electronic device are required to be updated, the manufacturer B generates a new asymmetric key pair (including a third public key and a third private key), and after completion of the steps in FIG. 2 that the manufacturer B ought to perform, the manufacturer B transmits the new encrypted booting instructions and the third public key to the electronic device in a wireless or wired manner to replace the old booting instructions and the second public key. The new encrypted booting instructions can then be decrypted using the first private key and the third public key on the user side.

In summary, in order to prevent sacrificing the power-on efficiency of the electronic device, this disclosure encrypts the booting instructions using a symmetric key, but does not directly encrypt the symmetric key and place the encrypted symmetric key in an unprotected storage area. In this way, the possibility of the symmetric key being cracked can be reduced. In addition, this disclosure uses two asymmetric key pairs to conduct encryption and decryption procedures, so that the manufacturer A can cooperate with a number of manufacturers for developments. Except for the manufacturer A, all other manufacturers use the asymmetric key pair generated by themselves along with the asymmetric key pair provided by the manufacturer A to generate a symmetric key. As a result, an issue of different manufacturers using the same symmetric key is resolved, and the system security is ensured.

This disclosure can be employed in applications other than the starting procedure of an electronic device, where the above-described booting instructions, software or firmware may be other types of confidential data, such as the identification code of the electronic device. The aforementioned manufacturer A and manufacturer B may also be, for example, the production and development departments of the same company, respectively.

The computing unit 310 can be implemented by hardware (e.g., circuits), software, and/or firmware. When being implemented by software or firmware, the computing unit 310 may utilize a processor, a controller, a micro control unit (MCU) or the like to execute program codes or instructions stored in a memory to perform the functions thereof. The storage unit 330 and the key storage unit 350 can be implemented by circuits.

Since people of ordinary skill in the art can appreciate the implementation detail and the modification thereto of the present method embodiment through the disclosure of the device embodiment, repeated and redundant description is thus omitted. Please note that there is no step sequence limitation for the method embodiments as long as the execution of each step is applicable. Furthermore, the shape, size, and ratio of any element and the step sequence of any flow chart in the disclosed figures are exemplary for understanding, not for limiting the scope of this disclosure.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. An electronic component comprising:
a key storage circuit that stores a first key;
a key protection circuit that is coupled to the key storage circuit and controls access of the key storage circuit;
a storage circuit that stores an encrypted data and a second key before the electronic component is started; and
a computing circuit that performs following steps:
reading the first key from the key storage circuit;
accessing the storage circuit to obtain the second key;
using the first key and the second key together to generate a third key; and
using the third key to directly decrypt the encrypted data.

2. The electronic component of claim 1, wherein the computing circuit further performs the following step:
after obtaining the first key, controlling the key protection circuit to prevent the key storage circuit from being accessed.

3. The electronic component of claim 1, wherein the electronic component further comprises a volatile memory, the first key read from the key storage circuit and the third key are temporarily stored in the volatile memory, and the computing circuit further performs the following steps
deleting the first key and the third key from the volatile memory after decrypting the encrypted data.

4. The electronic component of claim 1, wherein the second key is a public key of an asymmetric key pair.

5. The electronic component of claim 1, wherein the second key is not encrypted.

6. The electronic component of claim 1, wherein the first key is a private key of a first asymmetric key pair, the second key is a public key of a second asymmetric key pair, the third key is a symmetric key, and the third key is generated based on a public key of the first asymmetric key pair and a private key of the second asymmetric key pair.

7. The electronic component of claim 1, wherein the electronic component is applied to an electronic device, the data is a plurality of booting instructions, and the computing circuit further executes the booting instructions to cause the electronic device to start functioning.

8. A method of starting an electronic device, the electronic device comprising a key storage circuit storing a first key, a key protection circuit controlling access of the key storage circuit, and a storage circuit storing a second key and encrypted booting instructions before the electronic device is started, the method comprising:
reading the first key from the key storage circuit;
accessing the storage circuit to obtain the second key;

using the first key and the second key together to generate a third key;

using the third key to directly decrypt the encrypted booting instructions; and executing the booting instructions.

9. The method of claim 8 further comprising:

after obtaining the first key, controlling the key protection circuit to prevent the key storage circuit from being accessed.

10. The method of claim 8, wherein the electronic device further comprises a volatile memory, the first key read from the key storage circuit and the third key are temporarily stored in the volatile memory, the method further comprising:

deleting the first key and the third key from the volatile memory after decrypting the encrypted booting instructions.

11. The method of claim 8, wherein the second key is a public key of an asymmetric key pair.

12. The method of claim 8, wherein the second key is not encrypted.

13. The method of claim 8, wherein the first key is a private key of a first asymmetric key pair, the second key is a public key of a second asymmetric key pair, the third key is a symmetric key, and the third key is generated based on a public key of the first asymmetric key pair and a private key of the second asymmetric key pair.

14. An encryption method applied to an electronic device comprising a key storage circuit and a storage circuit, the encryption method comprising:

generating a first asymmetric key pair comprising a first public key and a first private key;

storing the first private key in the key storage circuit before the electronic device is started;

generating a second asymmetric key pair comprising a second public key and a second private key;

using the first public key and the second private key together to generate a symmetric key;

encrypting a data using the symmetric key to generate an encrypted data;

storing the encrypted data and the second public key in the storage circuit before the electronic device is started; and deleting the second private key and the symmetric key after the encrypted data is generated.

15. The encryption method of claim 14, wherein the second public key is not encrypted.

16. The encryption method of claim 14, wherein the symmetric key is generated using the first private key and the second public key.

* * * * *